No. 858,302. PATENTED JUNE 25, 1907.
T. H. MAPP.
APPARATUS FOR TREATING FORAGE.
APPLICATION FILED AUG. 6, 1906.

4 SHEETS—SHEET 1.

Witnesses

Inventor
Thomas H. Mapp
By James L. Norris
Attorney

No. 858,302. PATENTED JUNE 25, 1907.
T. H. MAPP.
APPARATUS FOR TREATING FORAGE.
APPLICATION FILED AUG. 6, 1906.

4 SHEETS—SHEET 4.

Witnesses

Inventor
Thomas H. Mapp
By James L. Norris
Attorney

UNITED STATES PATENT OFFICE.

THOMAS HENRY MAPP, OF SURRY HILLS, NEAR SYDNEY, NEW SOUTH WALES, AUSTRALIA.

APPARATUS FOR TREATING FORAGE.

No. 858,302.      Specification of Letters Patent.      Patented June 25, 1907.

Application filed August 6, 1906. Serial No. 329,464.

*To all whom it may concern:*

Be it known that I, THOMAS HENRY MAPP, a subject of the King of Great Britain, residing at 382 Bourke street, Surry Hills, near Sydney, in the State of New South Wales, Australia, have invented certain new and useful Improvements in Apparatus for Treating Forage, of which the following is a specification.

The invention relates to improved apparatus for treating forage such as lucerne, grass, clover, oats, wheat, maize and the like material before being compressed into blocks or bales.

According to my invention the forage is taken either in a green or dry condition and delivered into a chamber in which travels one or more horizontal or inclined endless apron carriers or conveyers preferably of sheet metal driven by sprocket wheels, and the forage when delivered into the hopper or feed opening falls on the conveyer or upon the uppermost one when more than one are employed. The material is carried along the conveyer and on passing the end thereof falls down a discharge opening or upon the end of the second conveyer which travels in the opposite direction, and so on according to the number of conveyers. In the chamber, especially between the traveling apron of each conveyer, are arranged one or more pipes for the passage of steam or hot air so that the heat therefrom is evenly distributed throughout the forage after which it is compressed into blocks or bales. Below each conveyer I preferably provide a steel or other hard brush in contact therewith to insure that all the material is discharged into the chute or onto the next lowermost conveyer.

Figure 1:
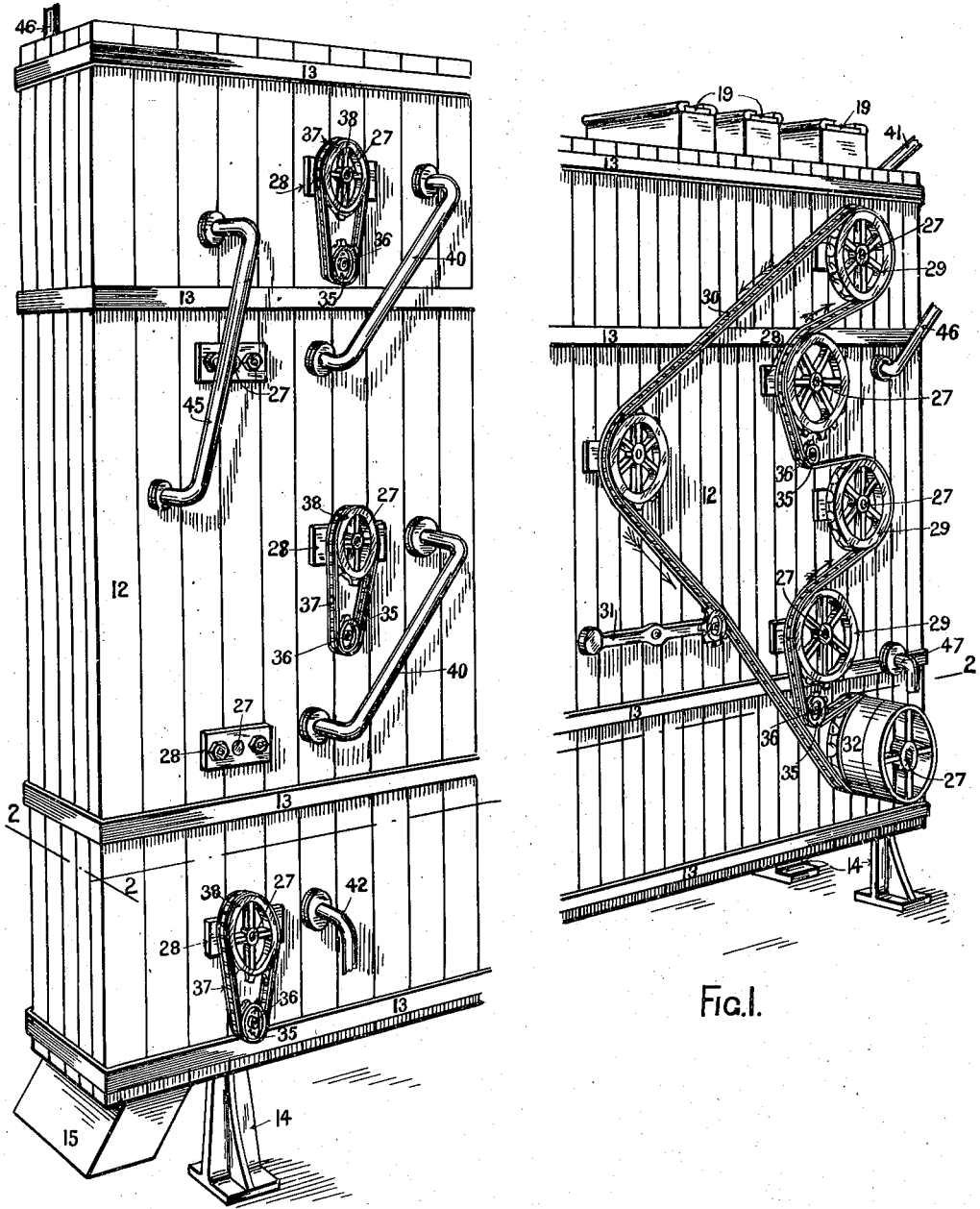
Figure 2:
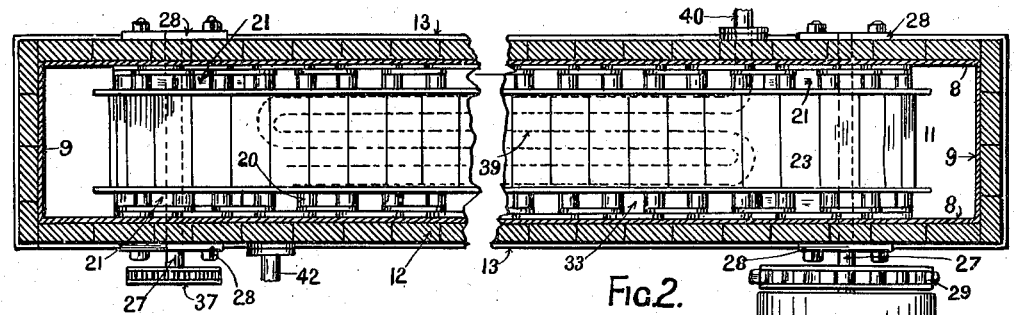
Figure 5:
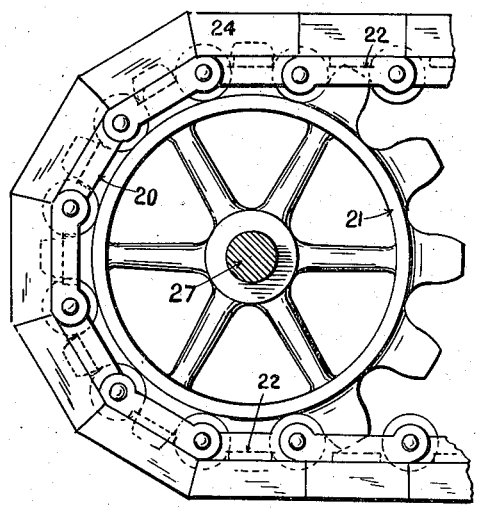
Figure 6:
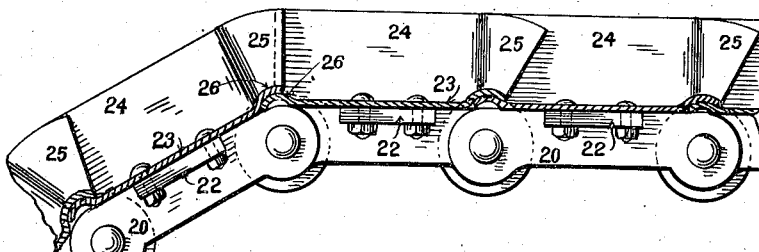
Figure 7:
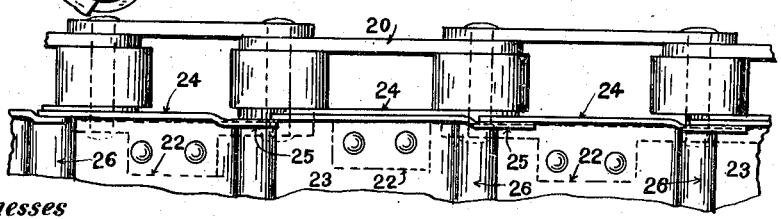
Figure 3:
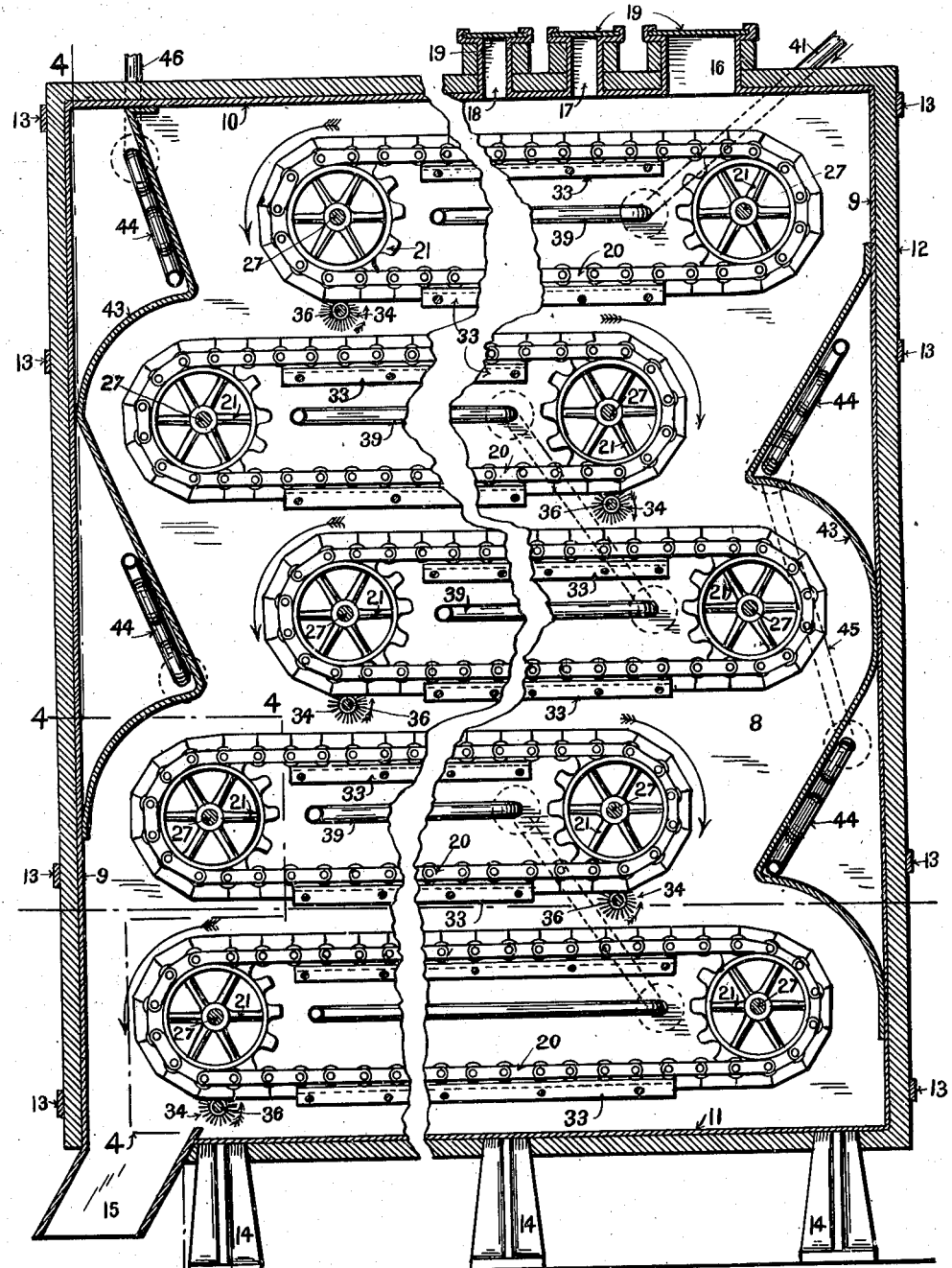
Figure 4:
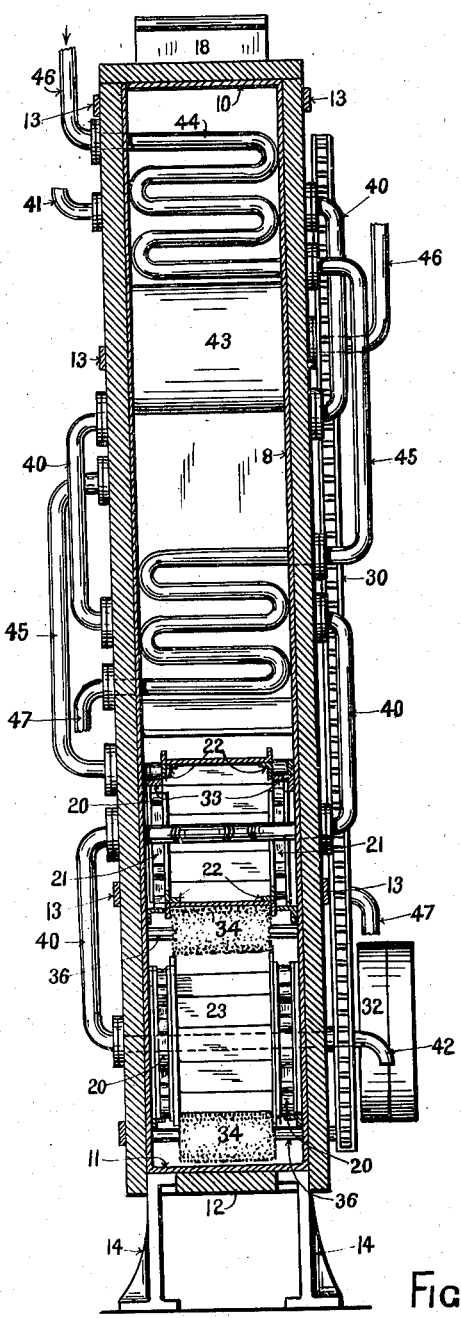

In the accompanying drawings which illustrate my invention, Figure 1 is a view in perspective of the exterior of the apparatus. Fig. 2 is a sectional plan on the plane 2—2 of Fig. 1. Fig. 3 is an elevation of the apparatus with one side of the casing or housing removed. Fig. 4 is a cross sectional elevation on the line 4—4 Fig. 3 portion being broken away, and, Figs. 5, 6, and 7, are enlarged detail views illustrating portions of a conveyer and its aprons.

The same numerals refer to the same or corresponding parts.

The casing or housing consists of sides 8, ends 9, top 10 and bottom 11 and is entirely surrounded by lagging or suitable non-conducting material 12 bound by bands 13. To the bottom 11 are attached legs 14, and a chute 15 communicating with the interior. Feed openings 16, 17, and 18, are provided in the top 10 each having sliding covers 19, the larger opening 16 being for feeding long stalked forage and those numbered 17 and 18 for grain and the like or short or chopped forage. Within the casing are a series of carriers or traveling conveyers one above the other consisting of two endless roller chains 20 passing over sprocket wheels 21 said chains having lugs 22 on the inside of the innerlinks to which lugs are bolted the aprons 23. The said aprons have flanges 24 provided with extensions 25 so that the extensions of one apron will fit inside the flanges 24 of the adjoining apron. The part has semicircular laps 26 so that a lap of one apron will lie over and above the adjoining lap of the next one. The object of said extensions and laps is to prevent a gap being left between the aprons when they are passing round the sprocket wheels 21. The sprocket wheels of the carriers have spindles 27 rotating in bearings 28 and the spindles of one set of sprocket wheels of each carrier project outside the casing and have driving sprockets 29 gearing with an endless chain 30. 31 is a chain tightener and 32 a driving pulley attached to one of the said spindles.

It will be seen that each carrier travels in an opposite direction to the one immediately below it. In order to insure easier motion and prevent sagging I provide angle iron ledges 33 secured to the sides 8. Beneath the discharge end of each carrier is a brush 34 to clean the aprons and rotating oppositely thereto, said brushes at one end being driven by the sprockets 35 on the spindles 36 gearing with the endless chain 30. The brushes on the opposite end have their sprockets 35 gearing with endless chains 37 passing over the sprockets 38 on spindles 27. Between and extending nearly the whole length of each carrier is a set of steam or hot air pipes 39, the set between each carrier being connected by external pipes 40. 41 is the inlet thereto and 42 the outlet. Within and secured to the ends 9 of the casing are shields 43 and in the spaces between the ends 9 and said shields are sets of heating pipes 44 each set being connected by external pipes 45. 46 represents the inlet and 47 the outlet pipes.

In carrying my invention into operation steam or hot air is let into the heating pipes 39 and 44 and motion given to the pulley 32. The forage is then delivered through the opening 16, 17, or 18, or all of them if a combination of materials is being used, and is deposited on the uppermost traveling carrier and having reached the end thereof is delivered onto the aprons of the next lower carrier which is moving in an opposite direction and so on until it reaches the chute 15 from whence it is discharged into a suitable press to be compressed.

It will be evident that I may use a more or less number of traveling carriers without departing from the invention, and they need not necessarily be horizontal. The position of the discharge chute will depend on the number of carriers employed.

Having now described my invention, what I claim as new and desire to secure by Letters Patent is:—

1. In an apparatus of the class described, a casing, a plurality of substantially parallel oppositely movable endless conveyers in said casing, heating pipes disposed between the upper and lower runs of the respective conveyers, shields within and secured at opposite sides of the casing to form heating spaces, heating pipes arranged within the spaces formed by the sides of the casing and shields, and cleaning brushes engaging the lower run of the conveyers substantially at the delivery ends of the latter.

2. In an apparatus of the class described, a casing surrounded by suitable non-conducting material, a plurality of substantially parallel horizontally disposed endless conveyers, sprocket gearing for driving said conveyers oppositely to each other, each conveyer serving to deliver material on to the next lower conveyer, shields within and secured to the opposite side walls of the casing and adapted to form heating chambers, heating pipes arranged within each of the spaces, said casing having a feed opening to supply material to the top conveyer and also having a discharge opening for the passage of material from the lowermost conveyer, heating pipes disposed between the upper and lower runs of the respective conveyers, and cleaning brushes in contact with the respective conveyers and rotatable oppositely thereto.

In testimony whereof I have hereunto set my hand in presence of two subscribing witnesses.

THOMAS HENRY MAPP.

Witnesses:
 HENRY WATCHORNE CLARKE,
 MABEL EUGÉNIÈ DE LANGE.